Figure 9:
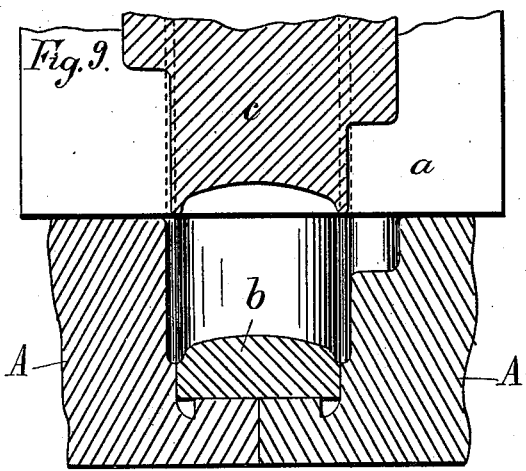

(No Model.)  5 Sheets—Sheet 1.
A. R. & M. S. SMITH.
APPARATUS FOR MANUFACTURING BICYCLE WHEEL RIMS.
No. 594,661.  Patented Nov. 30, 1897.
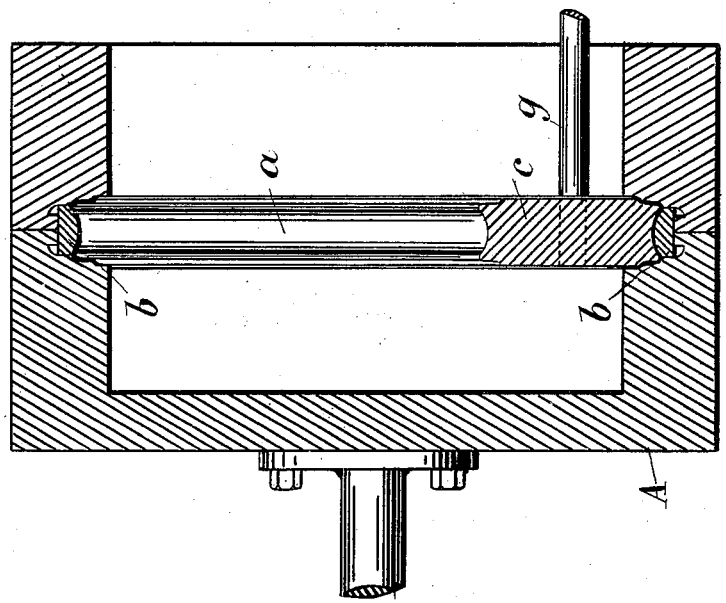
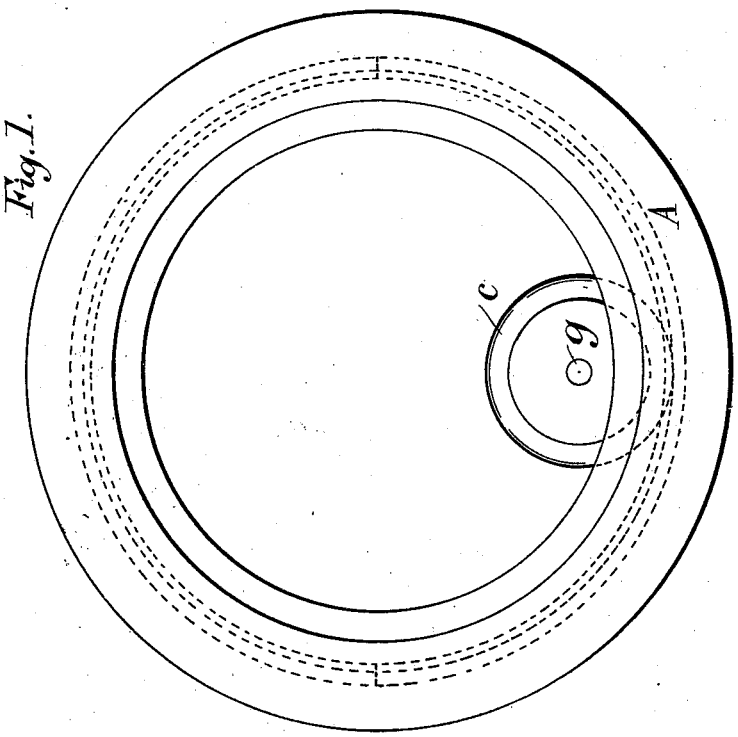
Witnesses:
J. Smgg Poole
George H. Bliss
Inventors:
Albert R. Smith, and
Matthew S. Smith.
by Herbert W. Jenner.
Attorney (No Model.) 5 Sheets—Sheet 2.
A. R. & M. S. SMITH.
APPARATUS FOR MANUFACTURING BICYCLE WHEEL RIMS.
No. 594,661. Patented Nov. 30, 1897.
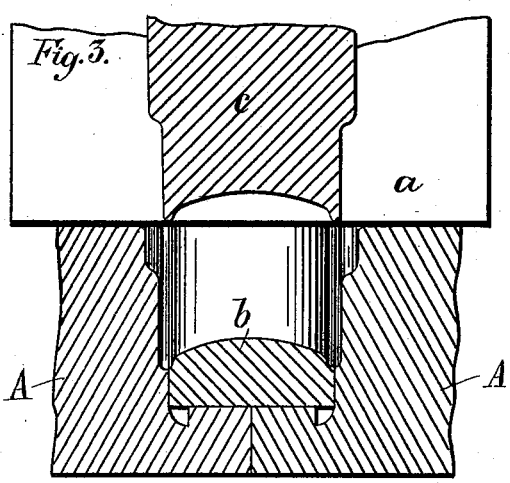
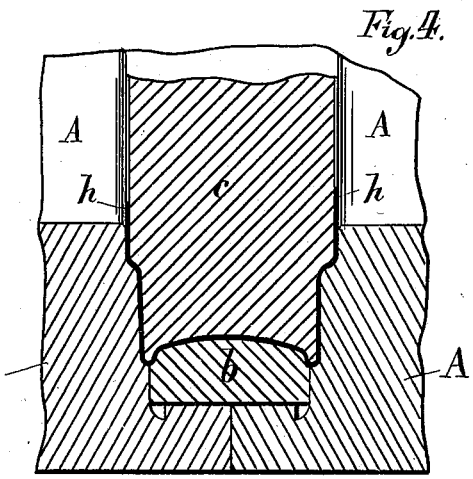
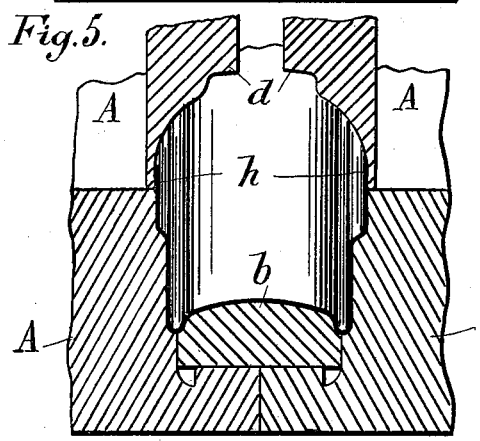
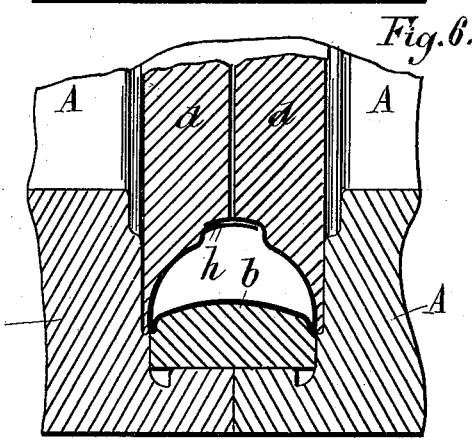
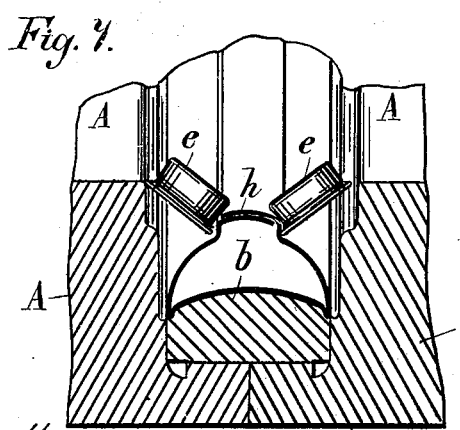
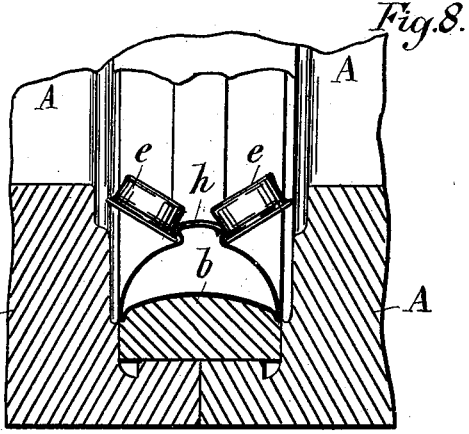
Witnesses:
J. Gregg Poole
George H. Bliss
Inventors:
Albert R. Smith, and
Matthew S. Smith.
by Herbert W. T. Jenner
Attorney.

(No Model.) 5 Sheets—Sheet 3.

A. R. & M. S. SMITH.
APPARATUS FOR MANUFACTURING BICYCLE WHEEL RIMS.

No. 594,661. Patented Nov. 30, 1897.

Witnesses:
J. J. Gregg Poole
George H. Bliss

Inventors:
Albert R. Smith, and
Matthew S. Smith.
by Herbert W. T. Jenner.
Attorney.

(No Model.) 5 Sheets—Sheet 4.

A. R. & M. S. SMITH.
APPARATUS FOR MANUFACTURING BICYCLE WHEEL RIMS.

No. 594,661. Patented Nov. 30, 1897.

Witnesses:
J. Mygg Poole
George H. Bliss

Inventors.
Albert R. Smith, and
Matthew S. Smith.
by Herbert W. Jenner
Attorney (No Model.)  A. R. & M. S. SMITH.  5 Sheets—Sheet 5.
APPARATUS FOR MANUFACTURING BICYCLE WHEEL RIMS.
No. 594,661.  Patented Nov. 30, 1897.

Witnesses:
J. J. Gregg Poole
George H. Bliss

Inventors
Albert R. Smith, and
Matthew S. Smith.
by Herbert W. Jenner.
Attorney

UNITED STATES PATENT OFFICE.

ALBERT RUSSELL SMITH AND MATTHEW SIDNEY SMITH, OF LONDON, ENGLAND.

APPARATUS FOR MANUFACTURING BICYCLE-WHEEL RIMS.

SPECIFICATION forming part of Letters Patent No. 594,661, dated November 30, 1897.

Application filed April 12, 1897. Serial No. 631,771. (No model.)

*To all whom it may concern:*

Be it known that we, ALBERT RUSSELL SMITH and MATTHEW SIDNEY SMITH, subjects of the Queen of Great Britain and Ireland, residing at 22 Talcott Road, Battersea, London, England, have invented certain new and useful Improvements in Apparatus for the Manufacture of Bicycle-Wheel Rims; and we do hereby declare the following to be a full, clear, and exact description of the invention, such as will enable others skilled in the art to which it appertains to make and use the same.

This invention relates to apparatus for making wheel-rims; and it consists in the novel construction and combination of the parts hereinafter fully described and claimed.

In order that our invention may be more fully understood, we will now proceed to describe same with reference to the accompanying drawings, in which—

Figure 1 is a front elevation of an internal split roll or chuck suitable for use in connection with the manufacture of hollow or tubular junctionless or unbrazed rims, Fig. 2 being a vertical section through same. Figs. 3 to 26 are detail sectional views illustrating the various processes in the manufacture.

Referring to the first portion of our invention, which is illustrated in Figs. 3 to 6 of the accompanying drawings, Fig. 3 represents in section the band or hoop $a$ in position in the internal split roll or chuck A, the ring $b$ being a detachable portion of same formed in halves. The presser or roll $c$, which is mounted upon a suitable spindle $g$, Figs. 1 and 2, and operated in any convenient manner, is then brought to bear upon the band or hoop $a$, thus forming or giving it the trough-shaped section shown in Fig. 4. The roller $c$ is then removed, and the split roller $d$ is brought to bear against and presses inward the edges $h$, as shown, Fig. 5, which brings them together, as illustrated in Fig. 6. The roller $d$ is left in position, while the two smaller rollers $e$ $e$, Fig. 7, working from a common center, clip the edges to the finished form shown in Fig. 8.

Figure 10:
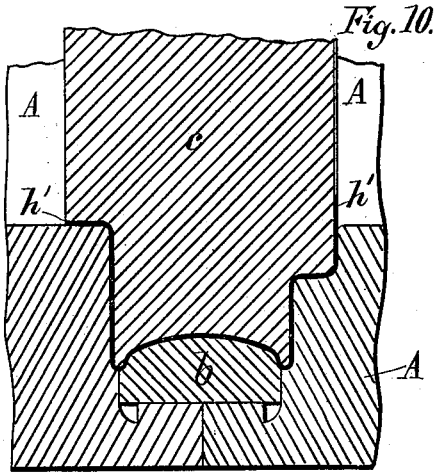
Figure 11:
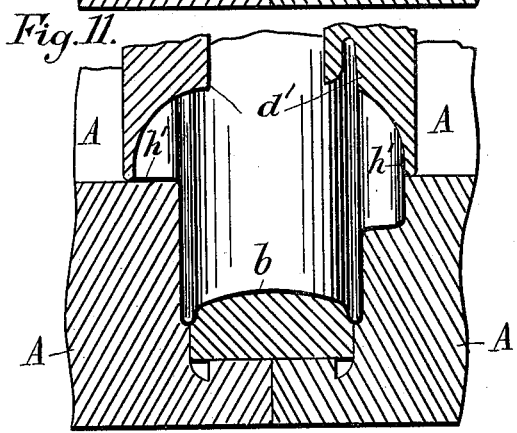
Figure 12:
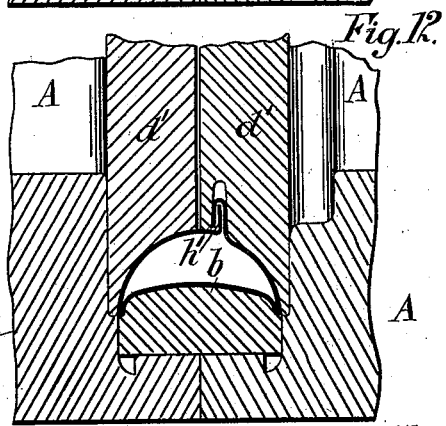
Figure 13:
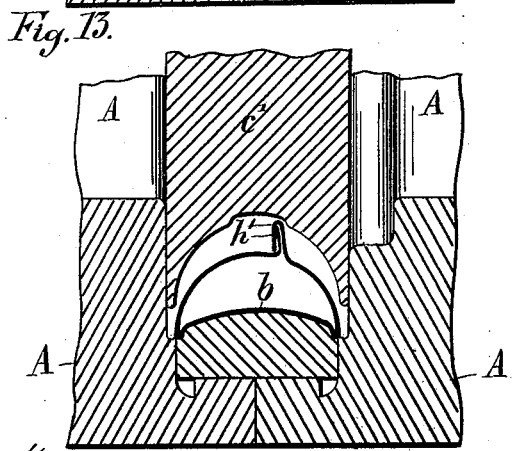
Figure 14:
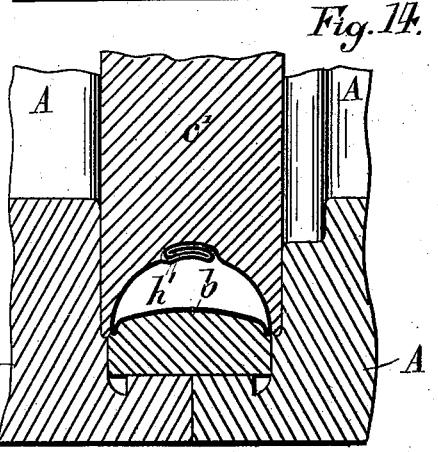
Figure 15:
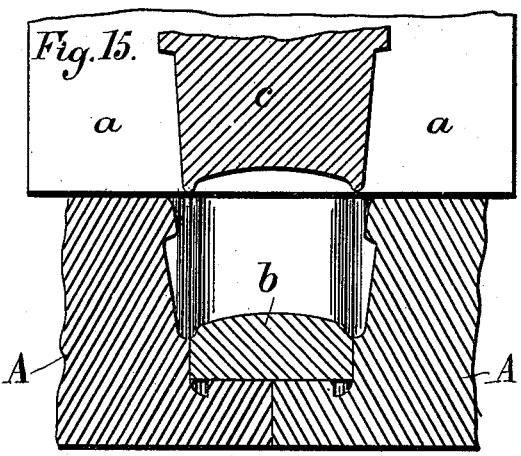
Figure 16:
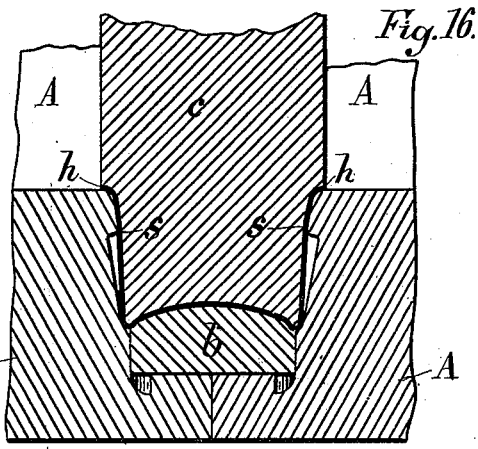
Figure 17:
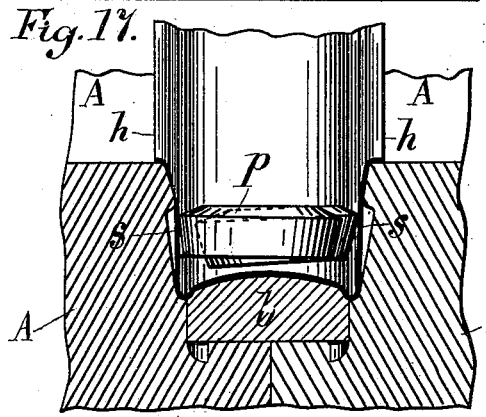
Figure 18:
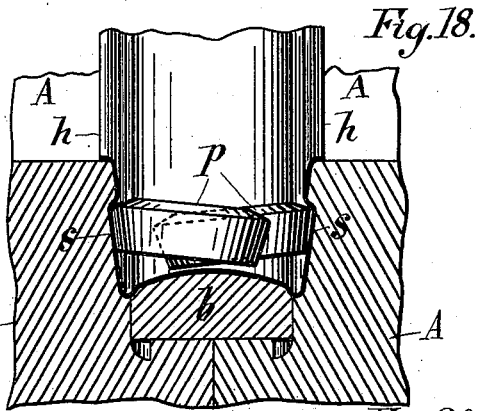

Instead of making the rim with a clipped joint, as shown in Fig. 8, it may be made with a folded joint, the process for which is illustrated in Figs. 9 to 14 of the accompanying drawings. According to this form of our invention the band or hoop $a$ is placed in position in the internal split roll or chuck A, Fig. 9, the ring $b$ being a detachable portion of same formed in halves. The presser or roller $c$, Figs. 9 and 10, is then brought to bear upon the band or hoop $a$, thus forming or giving it a trough-shaped section, as shown in Fig. 10. The roller $c$ is then removed, and the split roller $d'$ is brought to bear upon the edges $h'$, Fig. 11, pressing them inward, thus closing the rim and partly closing the joint, as shown in Fig. 12, when the roller $d'$ is withdrawn, and a second roller $c'$, Figs. 13 and 14, is brought to bear upon the partially-folded joint and finishes the rim, as shown in Fig. 14.

Figure 19:
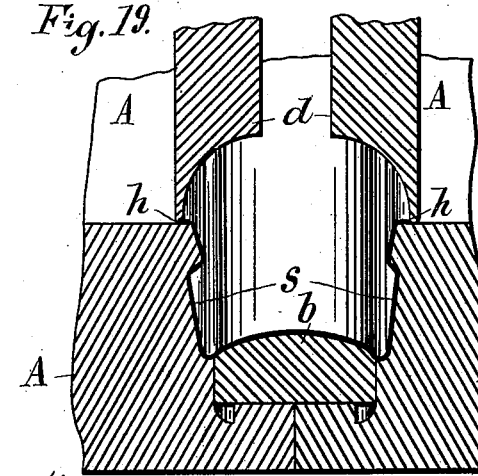
Figure 20:
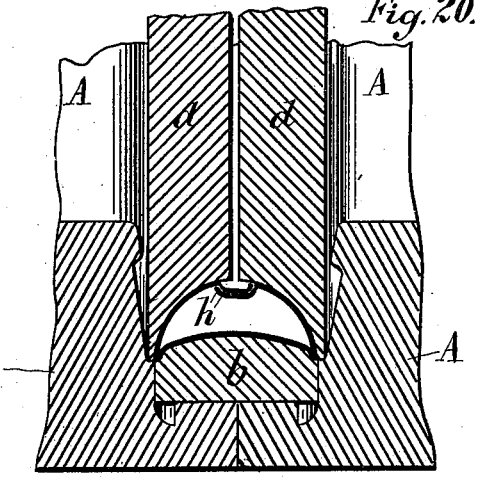
Figure 21:
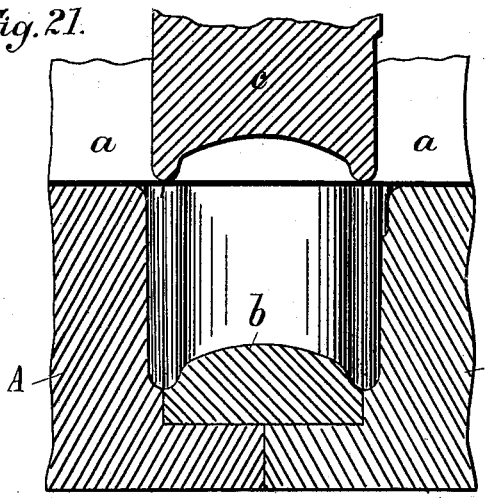
Figure 22:
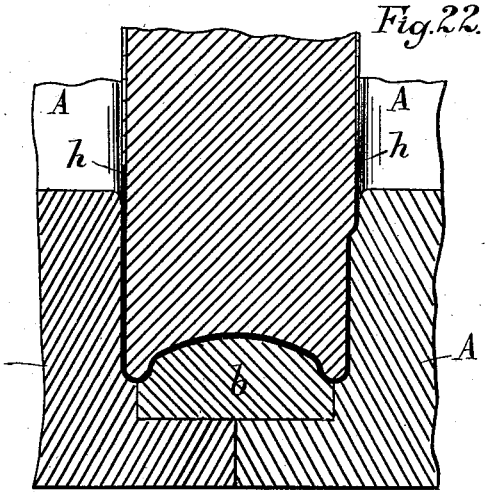
Figure 23:
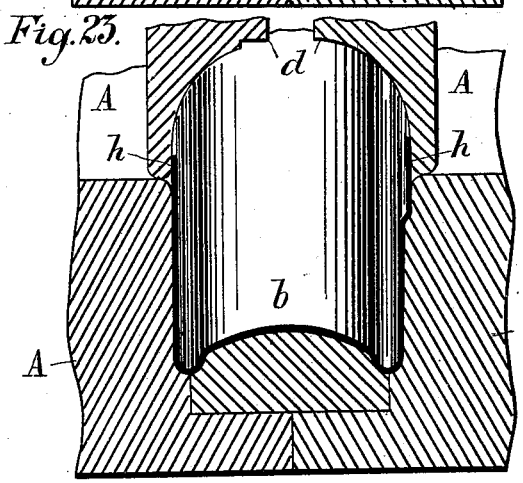

As a further modification of our invention and which is illustrated in Figs. 15 to 20 of the accompanying drawings, the clipped joint, instead of being formed upon the outside of the rim, as shown in Fig. 8, may be arranged within the rim, Fig. 20. In this arrangement the band or hoop $a$ is placed in position within the internal split roller or chuck A, of which the ring $b$ is a detachable portion of same formed in halves. The roller $c$ is then brought to bear upon same, forming or giving it the trough-shaped section shown in Fig. 16. The roller $c$ is kept in position, and two supplementary rollers $p$, acting from a common center, are brought to bear upon the sides $s$ of the rim, Fig. 17, giving it the shape shown in Fig. 18. The rollers $c$ and $p$ are then withdrawn, and a split roller $d$, Fig. 19, is brought to bear upon the edges $h$ of the partially-formed rim and which draws them away from the sides of the internally-split roller or chuck A and closes and clips them, forming the joint, as shown at Fig. 20.

Figure 24:
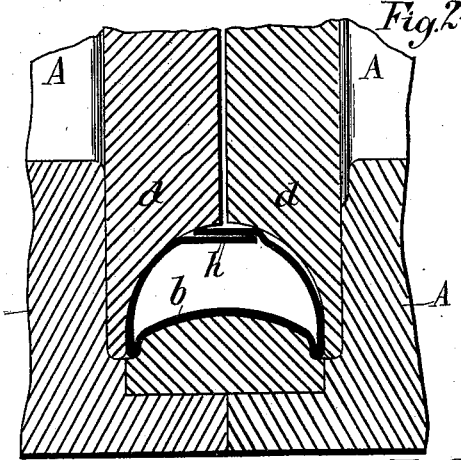

Instead of making the rims as shown in Figs. 3 to 20, inclusive, they may be made of heavier gage, so as to be suitable for carriages, cabs, motor-cars, and the like, and this form of our invention is illustrated in Figs. 21 to 24 of the accompanying drawings. In this case the band or hoop $a$ is placed in position in the internally-split roller or chuck A, of which the ring $b$ is a detachable portion of same formed in halves. The presser or roller $c$ is then brought to bear upon the band or hoop $a$, thus forming or giving it the trough-shaped section shown in Fig. 22. The roller c is then removed and the split roller d brought to bear upon the edges h, as shown, Fig. 23, pressing them inward and closing the rim to its final form, as shown at Fig. 24, the fastening being effected by the spoke-nuts or the like.

Figure 25:
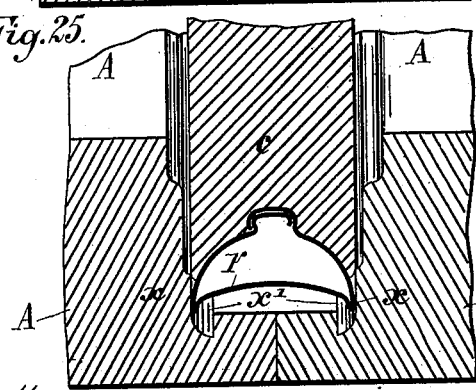
Figure 26:
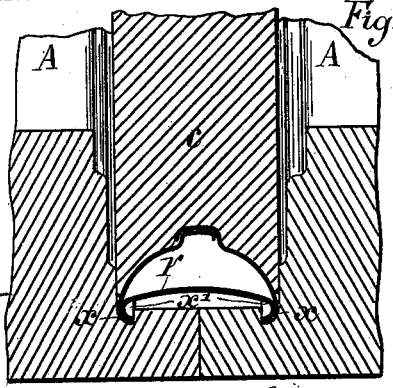

Instead of the rims being left at the shapes shown in Figs. 8, 14, 20, and 24 the edges may be given any desired curve, the process of which is illustrated in Figs. 25 and 26 of the drawings. In this case the rim r is placed in the internal roll or chuck A, and the presser or roller c is brought to bear upon same, Fig. 25, which presses the edges x of the rim, Fig. 25, into the curved recesses $x'$ in the roll or chuck A, which gives them the shape shown in Fig. 26.

It will thus be seen that by our invention the manufacture of tubular or hollow junctionless or unbrazed rims is considerably simplified, thereby cheapening the cost of manufacture, while the number of processes required to produce the finished article are reduced to a minimum. For example, the rim illustrated in Figs. 3 to 8 is produced by about three processes after the band or strip has been rolled to the required size for forming the rim, while that illustrated in Figs. 9 to 14 is also produced in three rolling operations, and the further rims illustrated in the drawings are produced by a correspondingly small number of processes as compared with the methods now employed for producing hollow or tubular junctionless or unbrazed rims.

Having now described our invention, what we claim as new, and desire to secure by Letters Patent, is—

In apparatus for making wheel-rims, the combination, with an internal and circumferentially-divided chuck, and a ring divided transversely and seated in the said chuck; of a presser-roll for forming the tread of the rim, and a circumferentially-divided presser-roll for subsequently bringing together the sides of the rim and forming its under portion, substantially as set forth.

In testimony whereof we affix our signatures in presence of two witnesses.

ALBERT RUSSELL SMITH.
MATTHEW SIDNEY SMITH.

Witnesses:
FREDK. GEO. CASSELL,
CHAS. LEASON.